United States Patent [19]
Wells et al.

[11] 4,026,326
[45] May 31, 1977

[54] ACTUATOR PILOT FOR FLUID PRESSURE MONITORING SAFETY SYSTEM

[75] Inventors: Richard E. Wells, Westminster; Victor E. Derval, Seal Beach; John D. Muchow, Cerritos, all of Calif.

[73] Assignee: Willis Oil Tool Co., Long Beach, Calif.

[22] Filed: Sept. 22, 1975

[21] Appl. No.: 615,368

Related U.S. Application Data

[62] Division of Ser. No. 440,165, Feb. 6, 1974.

[52] U.S. Cl. .......................... 137/625.66; 137/458; 137/624.27; 137/625.6
[51] Int. Cl.² .................. F16K 17/00; F15B 13/01
[58] Field of Search ........ 251/14; 137/458, 624.27, 137/625.6, 625.64, 625.66

[56] References Cited
UNITED STATES PATENTS

| 2,394,487 | 2/1946 | Rotter et al. | 251/297 X |
| 3,304,953 | 2/1967 | Wickline et al. | 137/625.6 X |
| 3,542,073 | 11/1970 | Holbrook | 137/625.66 |
| 3,610,284 | 10/1971 | Spencer | 137/625.66 |
| 3,746,401 | 7/1973 | Stearns | 137/624.27 X |
| 3,791,398 | 2/1974 | Vickery | 137/625.66 |
| 3,823,739 | 7/1974 | McMullan | 137/624.27 |
| 3,874,414 | 4/1975 | Dollison | 137/625.66 |
| 3,874,415 | 4/1975 | Pierce et al. | 137/625.66 |
| 3,877,484 | 4/1975 | Theriot et al. | 137/625.66 |
| 3,888,457 | 6/1975 | Taylor | 251/14 |

Primary Examiner—Alan Cohan
Assistant Examiner—Gerald A. Michalsky
Attorney, Agent, or Firm—Paul A. Weilein

[57] ABSTRACT

A shut-off valve in a fluid line closes by spring pressure and incorporates a control chamber wherein pressurized control fluid acting on a piston opens the valve in opposition to the spring pressure. A control system for the shut-off valve comprises a 3-way actuator pilot of the present invention in cooperation with a monitor pilot. The actuator pilot has a valve spool and four ports, namely, a supply port connected to a source of pressurized control fluid, a pilot port connected to the monitor pilot, a control port connected to the control cylinder of the shut-off valve, and an exhaust port for venting the control chamber of the shut-off valve. When the control system is in service and the monitor pilot senses an undue change in the pressure in the fluid line, the monitor pilot vents the actuator pilot to shift the valve spool therein to cut off the control fluid from the control port and simultaneously to place the control port in communication with the exhaust port to cause the shut-off valve to close.

2 Claims, 8 Drawing Figures

ACTUATOR PILOT FOR FLUID PRESSURE MONITORING SAFETY SYSTEM

This is a division of application Ser. No. 440,165, filed Feb. 6, 1974.

BACKGROUND OF THE INVENTION

It is common practice to control a shut-off valve in a fluid line by means of a monitor pilot in combination with a 3-way actuator pilot. For this purpose a control cylinder incorporated in the structure of the shut-off valve has a piston to open the shut-off valve in response to the pressure of control fluid and in the absence of the pressure from the control fluid the shut-off valve closes by spring pressure and/or line pressure. The 3-way actuator pilot normally places the control cylinder in communication with a source of pressurized control fluid to keep the shut-off valve open, but when the actuator pilot is vented through a pilot port it not only cuts off the control fluid from the control cylinder, but also releases control fluid from the control cylinder to cause the shut-off valve to close by means of spring pressure and/or line pressure. The monitor pilot senses changes in the pressure in the fluid line and control the actuator pilot accordingly.

The present invention is directed to improvements in the actuator pilot in such a control system.

SUMMARY OF THE INVENTION

One object of the invention is to provide an efficient, compact actuator pilot that is reliable and trouble free. The actuator pilot has an inlet port for the control fluid, an outlet port connected to a control cylinder of the shut-off valve, a pilot port that controls the operation of the actuator pilot, and an exhaust port to exhaust the control cylinder. At a first normal limit position of a valve spool in the actuator pilot, the valve spool places a source of control pressure in communication with a control cylinder of the shut-off valve to keep the shut-off valve open for normal flow through the fluid line. Whenever the pilot port is vented to the atmosphere, the valve spool moves axially from its first normal limit position to a second limit position to cut off the source of control fluid and simultaneously release control fluid from the control cylinder to cause the shut-off valve to close by means of spring pressure and/or line pressure.

A second object of the invention is to provide an actuator pilot that may be easily and quickly manually set to initiate normal flow through the fluid line that is controlled by the shut-off valve, there being assurance that the actuator pilot will close the shut-off valve promptly in the event that some failure of a component in the fluid line or some other emergency causes the pressure in the fluid line to depart from a predetermined normal range. Simple finger pressure sets the actuator pilot for operation and it is not necessary to prolong the finger pressure because a detent that automatically engages the setting mechanism is effective until the pressure in the fluid line returns to the normal pressure range. For some installations the invention provides a force-multiplying lever that makes it easy to overcome the opposing fluid pressure.

Another object of the invention is to provide an actuator pilot in which the only moving part is the valve spool with a simple arrangement to keep the valve spool at its normal first position under normal operating conditions and to shift the valve spool to its second position automatically when the pilot port of the actuator pilot is vented by the fluid-pressure-sensing monitor pilot. For fail-safe operation, the valve spool is biased towards its second emergency position both by a spring and by fluid pressure on a first set of differential areas on the valve spool. Normally, relatively high fluid pressure acting on a second set of differential areas of the valve spool dominates the biasing force to keep the valve spool in its normal first position, but when the actuator pilot is vented by the monitor pilot the fluid pressure on the second set of differential areas drops abruptly to permit the biasing force to shift the valve spool to its second position to cause the shut-off valve to close.

The features and advantages of the invention may be understood from the following detailed description and the accompanying drawings.

BRIEF DESCRIPTION OF THE DRAWINGS

In the drawings, which are to be regarded as merely illustrative.

DESCRIPTION OF SELECTED EMBODIMENT OF THE INVENTION

The terms "normal" and "normally" as used in the following description refer to the normal operating state of the fluid system.

Figures 1, 8:
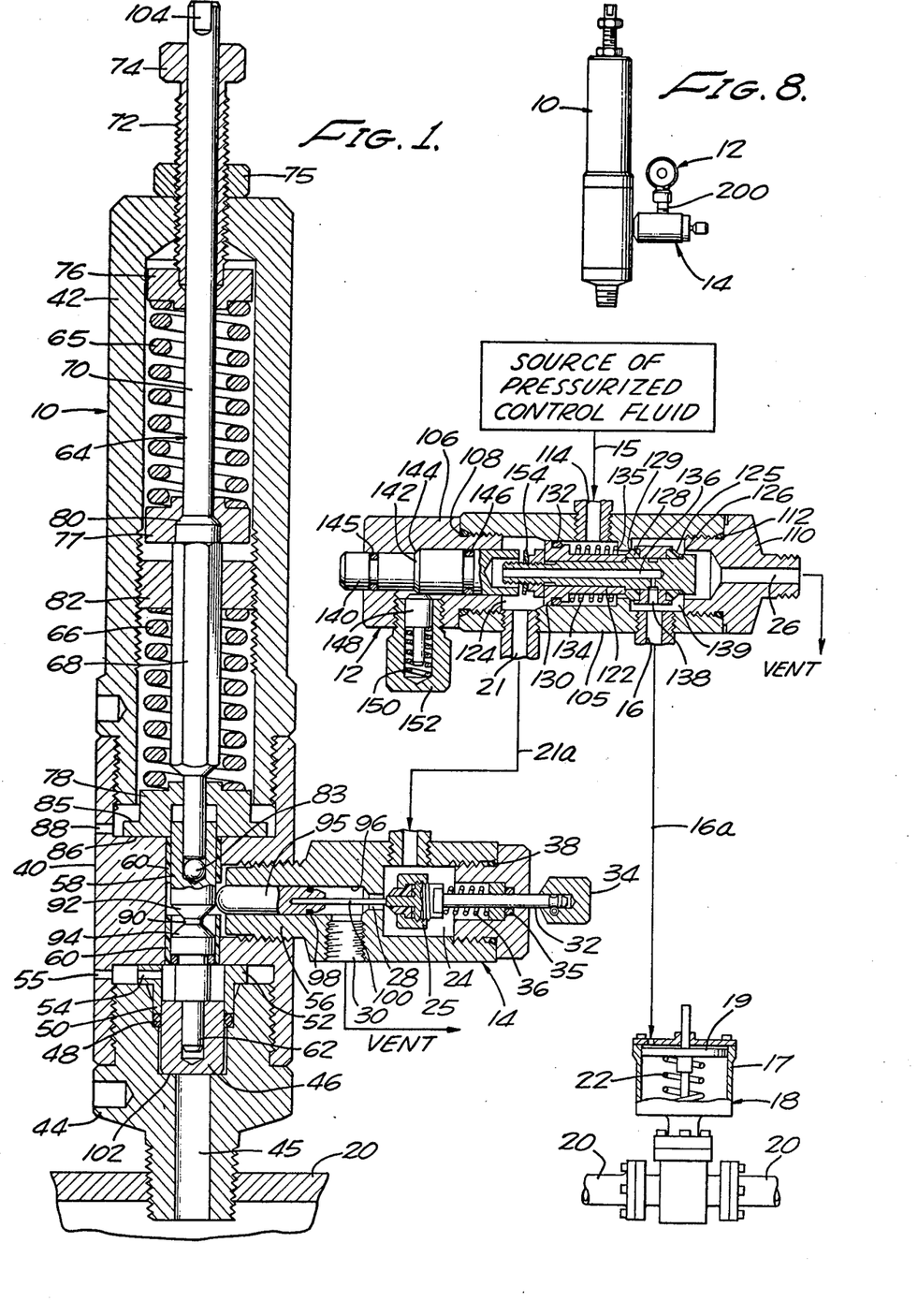
FIG. 1 is a partly diagrammatic view showing in section a two-spring monitor pilot and a 3-way actuator pilot in communication with the relief valve of the monitor pilot, the relief valve being open to vent the actuator pilot port and thereby cause the shut-off valve to close.
FIG. 7 is a diagram of another control system incorporating an actuator pilot and a monitor pilot and FIG. 8 is an elevational view, on a reduced scale, of a structural unit incorporating a monitor pilot, a relief valve and an actuator pilot.

FIG. 1 shows a two-spring monitor pilot, generally designated 10, with a 3-way block-and-bleed actuator pilot, generally designated 12, in communication with the relief valve 14 of the monitor pilot. FIG. 1 shows diagrammatically how a source of pressurized control fluid is connected to the actuator pilot 12 by a line 15, with an outlet port 16 of the actuator pilot connected by a line 16a to a control cylinder 17 of a shut-off valve, generally designated 18, in a fluid line 20 and with a pilot port 21 of the actuator pilot connected by a line 21a to the monitor pilot relief valve 14. It is assumed in FIG. 1 that the pressure in the fluid line 20 has dropped below the normal pressure range with the consequence that the monitor pilot opens its relief valve 14 to vent the actuator pilot 12 and thereby cause the shut-off valve 18 to close. The control cylinder 17 of the shut-off valve has a piston 19 which is moved upward by the pressure of a spring 22 and/or the pressure of the line fluid to the position shown in FIG. 1 to close the shut-off valve whenever the actuator pilot 12 releases the control fluid from the control cylinder 17.

The relief valve 14 has a chamber 24 which houses a valve member 25. The chamber 24 communicates through the line 21a with the pilot port 21 of the actuator pilot 12 and the chamber has a relief port 28 which communicates with a relatively large vent port 30 to the atmosphere. Valve member 25 is mounted on a stem 32 which carries an external knob 34 and is sealed by a sealing ring 35. A coil spring 36 surrounding the valve stem urges the valve member 25 towards closed position at the relief port 28. The knob 34 may be retracted manually to open the relief valve to vent the actuator pilot 12 independently of the monitor pilot 10. The body of the relief valve 14 is made in two parts which screw together and are sealed at their juncture by a sealing ring 38.

The monitor pilot 10 has a body comprising a basic body section 40, an upwardly extending spring housing 42 and a lower nipple fitting 44 which screws into the fluid line 20. The nipple fitting 44 has an axial passage 45 which is of stepped configuration to seat a piston 46 that senses changes in pressure in the fluid line 20. The piston 46 is sealed by a sealing ring 48 which is confined by a guide bushing 50 and the guide bushing has a flange 52 that is confined between the basic section 40 and the upper end of the nipple fitting 44. The flange 52 of the guide bushing has a radial bore 54 which communicates with a radial bore 55 of the pilot body to vent the space immediately above the piston 46. The basic section 40 of the monitor pilot body screw-threadedly receives an end nipple 56 of the relief valve 14.

A cylindrical cam body 58 is slidingly mounted in two guide sleeves 60 in the monitor pilot and is of stepped configuration with a lower end 62 of reduced diameter seated in the pressure-sensing piston 46. As shown, the upper end of the cam body 58 has a blind axial bore to seat the lower reduced end of an axial rod, generally designated 64, that is surrounded by a low pressure spring 65 and a high pressure spring 66. The axial rod 64 has a lower section 68 of hexagonal cross-sectional configuration and has an upper end section 70 of circular cross-sectional configuration which slidingly extends through an elongated bushing 72 in the upper end wall of the spring housing 42. The bushing 72 has a hexagonal head 74 and is embraced by a jam nut 75.

The low pressure spring 65 is compressed between an upper spring seat 76 that backs against the inner end of the bushing 72 and a lower spring seat 77 that abuts a tapered circumferential shoulder 80 of the axial rod 64 to apply downward force to the axial rod. The hexagonal section 68 of the axial rod 64 slidingly extends through a hexagonal opening of an upper spring seat 82 for the upper end of the high pressure spring 66. The spring seat 82 has an outer circumferential screw thread mating with an internal screw thread of the spring housing 42 to permit axial adjustment of the position of the spring seat. The inner end of the axial rod 64 abuts a circular ball 83 in an axial bore of the cam body 58 to transmit downward spring force thereto. A lower spring seat 78 for the high pressure spring 66 is formed with a radial flange 85 which has room for movement between a radial surface 86 and the lower threaded end of the spring housing 42. Normally, the lower spring seat 78 rests on the radial surface 86 as shown in FIG. 1. An adjacent radial bore 88 in the body of the monitor valve vents the space surrounding the lower spring seat 78 and the high pressure spring 66.

The cam body 58 has a circumferential groove 90 which forms two opposite tapered circumferential cam shoulders 92 and 94 for cooperation with a rounded nose of a cam follower 95 that is slidingly mounted in an axial bore 96 of the body of the relief valve 14. The cam follower 95 is embraced by a sealing ring 98 and has a short axial stem 100 which abuts the valve member 25 of the relief valve 14. Thus, the spring 36 of the relief valve 14 urges the cam follower 95 against the side of the cam body 58.

Figure 3:
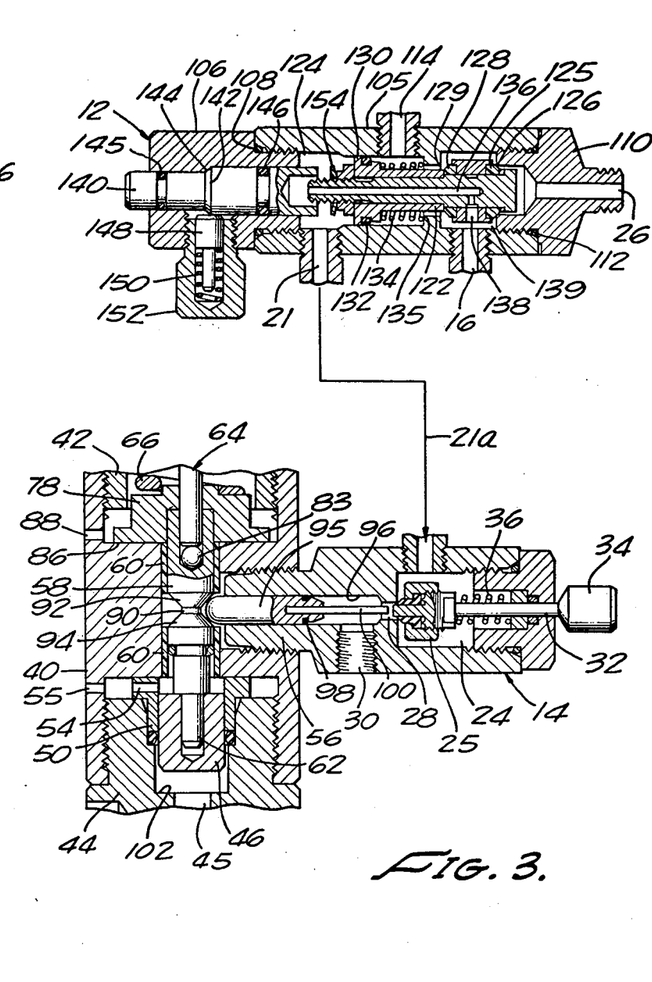
FIG. 3 is a view similar to FIG. 2 showing how the parts of the monitor pilot, the relief valve and the 3-way actuator pilot are positioned when the control system is in service with the line pressure in a normal range of pressure.

When the pressure in the fluid line 20 is within a predetermined normal range of pressures, the cam body 58 and the cam follower 95 are positioned as shown in FIG. 3 where the rounded nose of the cam follower seats in the circumferential groove 90 of the cam body to permit the valve member 25 of the relief valve 14 to close the relief port 28 and thereby cut off flow from the pilot port 21 of the actuator pilot 12. With flow prevented from the pilot port 21, the actuator pilot 12 keeps the source of pressurized control fluid in communication with the control cylinder 17 of the shut-off valve 18 to keep the shut-off valve open.

When the pressure in the fluid line 20 drops below the predetermined normal pressure range, the low pressure spring 65 acting on the spring seat 77 and the axial rod 64 overcomes the fluid pressure on the lower end of the piston 46 and shifts the piston downward to its lower limit position shown in FIG. 1 where the piston seats against an annular shoulder 102. The consequent downward shift of the cam body 58 causes the tapered shoulder 92 of the cam body to force the cam follower 95 to the position shown in FIG. 1 thereby causing the valve body 25 of the relief valve 14 to retract to open the relief port 28. With the relief port 28 open as shown in FIG. 1, fluid flows freely from the pilot port 21 of the actuator pilot 12 through the chamber 24 of the relief valve to the vent port 30 to cause the actuator pilot to release fluid from the control cylinder 17 and thereby permit the pressure of spring 22 and/or the line pressure to move piston 19 upward to the position shown in FIG. 1 to close the shut-off valve.

Figures 4, 5:
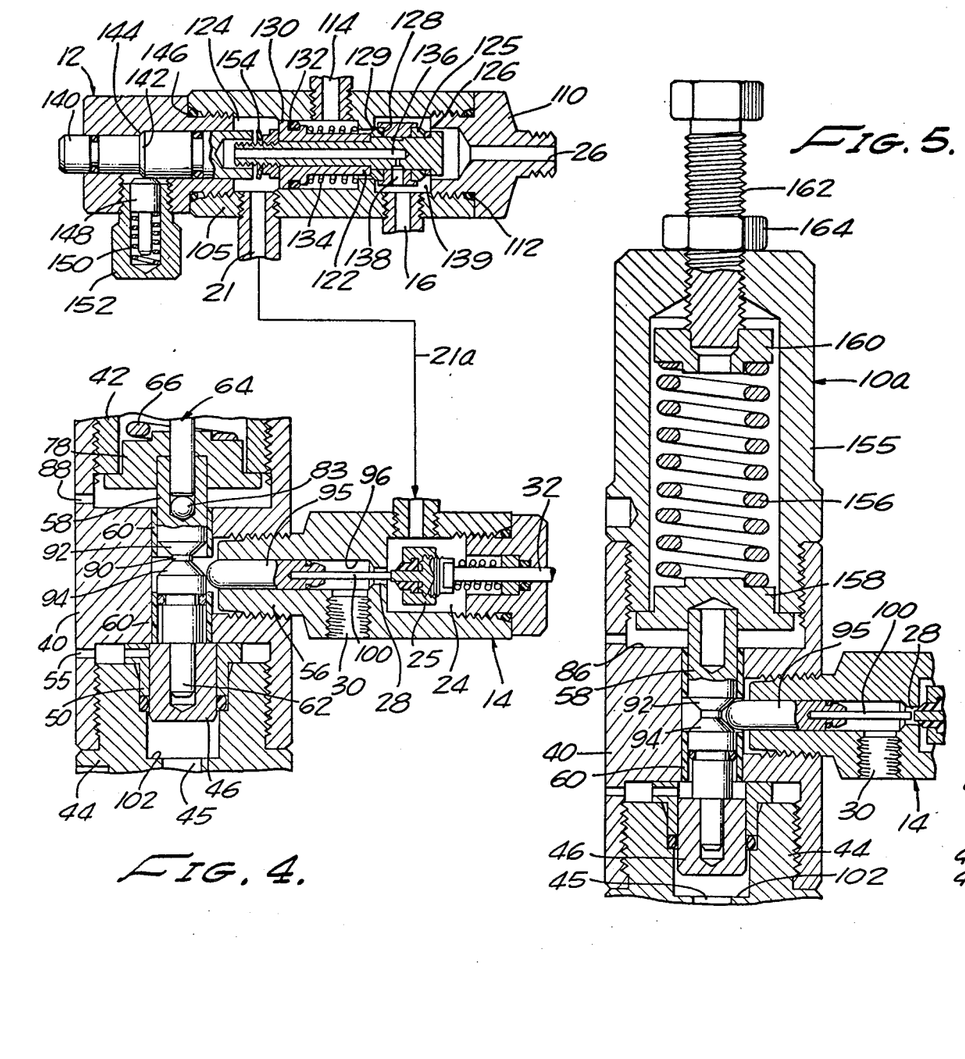
FIG. 4 is a similar view showing the position of the parts when departure of the line pressure from the normal range of pressures causes the monitor pilot to open the relief valve and thereby vent the actuator pilot piston to cause the shut-off valve to close.
FIG. 5 is a fragmentary sectional view of a single-spring monitor pilot designed to cause the shut-off valve to close only in the event that the line pressure drops below a normal pressure range.

On the other hand, when the pressure in the fluid line 20 rises above the predetermined normal range of pressures, the consequent increase in the fluid pressure against the piston 46 causes the high pressure spring 65 to yield with consequent upward shift of the spring seat 78 and the axial rod 64, thereby to cause upward shift of the cam body 58 from the neutral position shown in FIG. 3 to the high pressure position shown in FIG. 4. The upward shift of the shoulder 94 of the can body forces the cam follower 95 outward as indicated in FIG.

4 to open the relief valve 14 and thereby cause the actuator pilot 12 to close the shut-off valve 18.

The force exerted by the low pressure spring 65 may be adjusted to vary the lower end of the normal range of pressures in the fluid line 20 and the force exerted by the high pressure spring 66 may be adjusted to vary the upper end of the range of normal pressures in the fluid line. To adjust the pressure exerted by the low pressure spring 65, the jam nut 75 is loosened and the bushing 74 is rotated counterclockwise to lower the spring pressure or is rotated clockwise to increase the spring pressure. After such an adjustment has been made the jam nut 75 is tightened. The pressure of the low pressure spring 65 is always adjusted before a change is made in the pressure of the high pressure spring 66.

To adjust the force exerted by the high pressure spring 66 against the spring seat 78, a wrench is applied to a pair of flats 104 on the exposed upper end of the axial rod 64 and the axial rod is rotated to cause corresponding rotation of the screw threaded spring seat 82. Counterclockwise rotation of the axial rod 64 decreases the force exerted by the high pressure spring 66 against the lower spring seat 78.

Turning now to the present invention, the body of the actuator pilot 12 comprises an intermediate body section 105, an end section 106 which screws into the body section and is sealed by a sealing ring 108, and a second end section 110 which is sealed by a sealing ring 112. The actuator pilot 12 has four ports comprising an inlet port 114 for connection to the previously mentioned line 15 from the source of pressurized control fluid, the previously mentioned outlet port 16 for connection to the line 16a to the control cylinder 17 of the shut-off valve 18, the previously mentioned pilot port 21 for connection to the line 21a to the relief valve, and an exhaust port 26.

Figure 2:
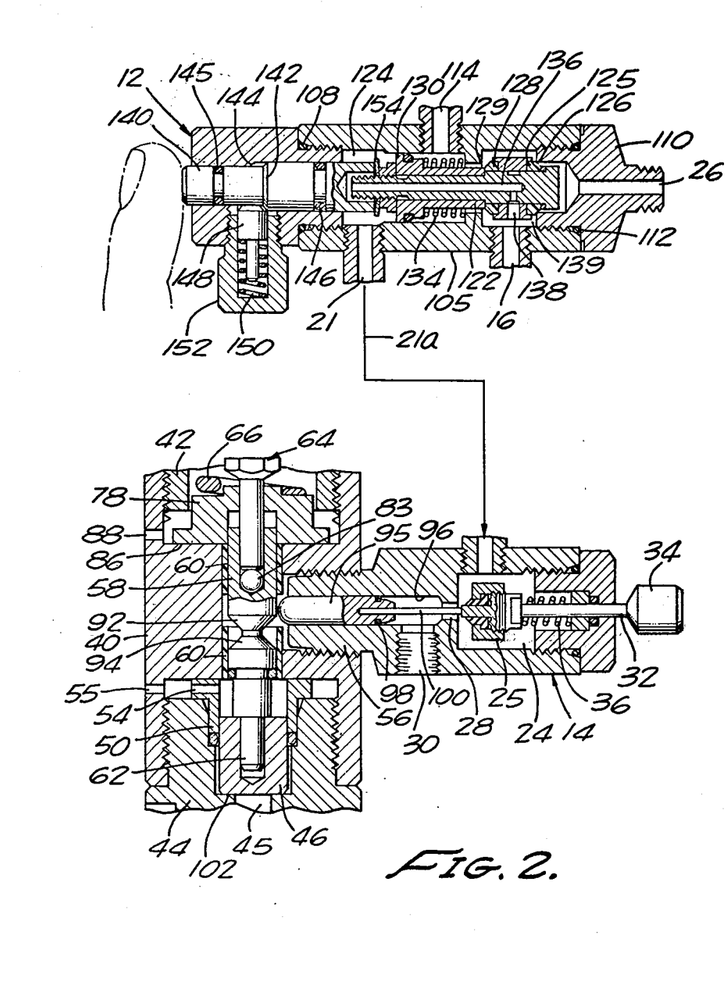
FIG. 2 is a fragmentary sectional view similar to FIG. 1 showing how a plunger of the actuator pilot may be manually depressed to override biasing means of the actuator pilot to cause the valve spool of the actuator pilot to shift to a position to place the source of control pressure in communication with the control cylinder of the shut-off valve thereby to cause the shut-off valve to open.

A valve spool, generally designated 122, which is slidingly mounted in the actuator pilot 12 is movable between a normal first right limit position shown in FIGS. 2 and 3 and a second left limit position shown in FIGS. 1 and 4. At the normal first right limit position of the valve spool, a first valve member in the form of a tapered elastomer ring 125 on the valve spool abuts a first right valve seat 126 and at this position the valve spool places the inlet port 114 in communication with the outlet port 16 to permit control fluid from the pressurized source to flow through the actuator pilot to the control cylinder 17 of the shut-off valve 18. At the second left limit position of the valve spool, a second left valve member in the form of a tapered elastomer ring 128 seats against a second left valve seat 129 to cut off flow to the outlet port 16 and at the same time to place the outlet port in communication with the exhaust port 26.

The left end portion of the valve spool 122 is enlarged to form a piston head 130 that is positioned in a first chamber 124 and embraced by a sealing ring 132. Means to bias the valve spool 122 towards the second left limit position shown in FIG. 1 comprises a coil spring 134 surrounding the valve spool in compression between the piston head 130 and an inner circumferential shoulder 135 of the actuator pilot body. The valve spool 122 is formed with a passage 136 from piston head 130 to a restricted radial orifice 138 that communicates with the space 139 forming a second chamber surrounding the valve spool between the two valve members 125 and 128. It is to be noted that orifice 138 is in communication with the outlet port 16 at both of the limit positions of the valve spool.

The described configuration of the valve spool 122 provides two opposite fluid pressure thrust forces each of which dominates in at least one stage of the operating cycle of the spool. One thrust force is created by fluid pressure against the inner annular face of the piston head 130 and is assisted by the spring 134 in urging the valve spool toward its second limit position against the second valve seat 129. The opposite thrust force is created by fluid pressure against the larger area of the outer face of the piston head to urge the valve spool towards its first limit position against the first valve seat 126.

Once the valve spool is at its second limit position shown in FIG. 1, the valve spool can be returned to its normal limit position shown in FIG. 2 only by the application of outside manual force of sufficient magnitude to overcome both the spring 134 and the force created by the high fluid pressure against the inner annular face of the piston head 130. Various arrangements for applying the overriding manual force may be used in various embodiments of the invention.

Referring to FIG. 1, a plunger 140 is slidably mounted in the outer end of the actuator pilot 12 and has a normal position at which the outer end of the plunger is exposed for manual operation. The plunger is urged outwardly by the fluid pressure in the valve chamber 124 and normally a tapered circumferential shoulder 142 of the plunger abuts a complementary tapered stop shoulder 144 of the valve body. The plunger 140 is embraced by two spaced sealing rings 145 and 146 and a detent member 148 formed with a chamfered nose acts on the plunger between the two sealing rings. In the construction shown, the detent member 148 is under the pressure of a compressed spring 150 and is slidingly mounted in a fitting 152 that screws into the side of the actuator pilot.

The tapered shoulder 142 of the plunger 140 not only cooperates with the stop shoulder 144 at the normal position of the plunger shown in FIG. 1, but also cooperates with the detent member 148 to yieldingly latch the plunger at a depressed position when, as shown in FIG. 2, the plunger is depressed by finger pressure. With the valve spool manually retained at its right position by depression of the plunger 140, control fluid is delivered to the control cylinder 17 to cause the shut-off valve to open. Opening of the shut-off valve causes progressive change of pressure in the fluid line 20 and when the pressure reaches the normal pressure range, monitor pilot piston 46 causes the cam body 58 to close the relief valve 14, as shown in FIG. 3, to cause the valve spool to be retained as its first limit position by the pressure of the control fluid as long as the pressure in the fluid line 15 stays in the normal range with the system in normal service.

The closing of the relief valve 14 causes the pressure of the control fluid in the actuator pilot 12 to rise to a normal high pressure and this pressure rise acting on the inner end of the plunger 140 overcomes the resistance of the detent member 148 with the consequence that the plunger 140 returns to its normal outer position shown in FIG. 3. Thus, once the plunger is manually depressed it acts automatically to stay depressed for whatever length of time is required for the line pressure to reach the normal pressure range and for normal control fluid pressure to be established in the actuator pilot.

After normal fluid pressure is established in the line 20, the monitor pilot 10 causes the shut-off valve 18 to close whenever the line pressure either rises above the normal range or drops below the normal range. It is to be noted, however, that if an excessive drop in line pressure causes the monitor pilot to close the shut-off valve 18 by opening the relief valve 14 as shown in FIG. 1, or if an excessive rise in line pressure causes the monitor pilot to close the shut-off valve by opening the relief valve as shown in FIG. 4, subsequent opening of the shut-off valve to restore the line pressure to its normal range can be accomplished only by manual depression of the plunger 140. Naturally, no attempt is made to restore the pressure in the line 20 by depressing the plunger 140 until the cause of the tripping of the monitor pilot 10 has been ascertained and remedied.

As may be seen in FIG. 1, the inner end of the plunger 140 telescopes over the reduced left end of the valve spool 122 and confronts resilient means in the form of a spring washer 154 on the reduced end of the valve spool. When the plunger 140 is manually depressed, it compresses the spring washer 154, as shown in FIG. 2, to transmit force to the valve spool. Subsequently, when the rise in fluid pressure in the actuator pilot tends to restore the plunger 140 to its normal position, the compressed spring washer 154 adds its force to boost the plunger out of engagement with the detent member 148. It is apparent that the spring washer permits tolerance with respect to the latched position of the plunger relative to the position of the displaced valve spool.

The behavior of the valve spool 122 in carrying out its function may be understood by reviewing FIGS. 1-4. FIG. 1 represents a stand-by state that has been created by an abnormal drop in the presence in line 20 causing the cam shoulder 92 to open the relief valve 14 and FIG. 4 represents a stand-by state that has been created by an abnormal rise in the line pressure causing the cam shoulder 94 to open the relief valve. At such a stand-by state, the shut-off valve 18 is, of course, closed with the consequence that there is little if any pressure on the line 20 downstream from the shut-off valve in the region of the monitor pilot 10.

The opening of the relief valve 14 has caused the valve spool 122 to shift to its second limit position shown in FIG. 1 to cut off the inlet port 114 and to permit control fluid in the line 16a and in the control cylinder 17 to escape to the atmosphere through the exhaust port 26. The valve spool is held at its second limit position both by the spring 134 and by the thrust of the high pressure control fluid against the inner annular face of the piston head 130.

After the cause of the tripping of the monitor pilot 10 has been corrected, the plunger 140 is manually depressed and automatically latched as shown in FIG. 2, to hold the valve spool 122 at its normal first limit position to permit control fluid to flow through the actuator pilot to the control cylinder 17 of the shut-off valve and thus cause the shut-off valve to open to restore the system to normal service. Initially and as long as the relief valve 14 remains open as shown in FIG. 2, the valve spool 122 tends to return to its second limit position in opposition to the finger pressure and/or in opposition to the detent. The valve spool tends to return both because of the pressure exerted by the spring and because there is a certain amount of pressure of the control fluid against the inner annular face of the piston head 130.

When the subsequent closing of the relief valve 14 by the monitor pilot 10 as shown in FIG. 3 occurs because of rise of pressure in the line 20 to the normal range, the pressure of the control fluid in the actuator pilot 12 rises to its normal high magnitude and now the high fluid pressure on the outer face of the piston head 130 is sufficient to keep the valve spool at its normal first limit position in opposition to the spring 134 and in opposition to the fluid pressure on the inner annular face of the piston head 130. It is to be noted that since the second end of the valve spool is continuously vented through the relief port 26, the high fluid pressure on the outer face of the piston head 130 is opposed by only atmospheric pressure on the second end of the valve spool and therefore at this stage the fluid pressure on the outer face of the piston head dominates both the spring 134 and the high fluid pressure on the inner annular face of the piston head.

The normal service state represented by FIG. 3 prevails until the monitor pilot 10 is tripped either as shown in FIG. 1 cras shown in FIG. 4 to open the relief valve 14 to vent the actuator pilot 12. The venting of the actuator pilot causes the valve spool 122 to return to its second limit position shown in FIGS. 1 and 4 because the escape of control fluid from the valve spool piston head 130 through the pilot port 21 again reduces the force of fluid pressure on the outer face of piston head 130 to an insignificant magnitude to cause the pressure exerted by the spring 134 together with the fluid pressure exerted on the inner annular face of the piston head to dominate and move the valve spool to its second limit position against the second valve seat 129. The return of the valve spool to its second limit position causes the shut-off valve 18 to close to result in a stand-by state illustrated either by FIG. 1 or FIG. 4.

FIG. 5 shows how a monitor pilot 10a may be substituted for the monitor pilot 10 of FIGS. 1-4 when it is desired that the shut-off valve be closed only in response to drop in the line pressure below the normal operating range. The monitor pilot 10a is largely identical with the previously described monitor pilot 10, as indicated by the use of corresponding numerals to designate corresponding parts. In FIG. 5, a spring housing 155 encloses a single spring 156 which expands when the pressure in the fluid line drops below the predetermined normal pressure range. The upper end of the cam body 58 is seated in a recess in a spring seat 158 for the lower end of spring 156. The upper end of the spring 156 backs against a spring seat 160 that, in turn, backs against the inner end of an adjustment screw 162 that carries a jam nut 164.

FIG. 5 shows the state of the monitor pilot 10a when the pressure in the fluid line is in the normal range. At that time the spring seat 158 is spaced above the radial surface 86 with sufficient clearance to permit the valve seat to shift the cam body 58 to the position shown in FIG. 1 when the line pressure drops below the normal range.

Figure 6:
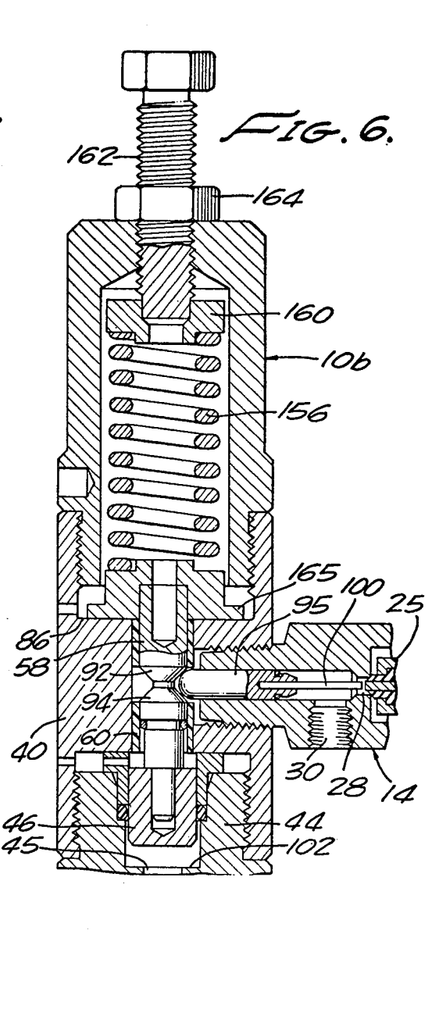
FIG. 6 is a view similar to FIG. 5 showing a monitor pilot with a single spring designed to cause the shut-off valve to close only when the line pressure exceeds a normal pressure range.

FIG. 6 shows a monitor pilot, generally designated 10b, that may be substituted for the monitor pilot 10 of FIGS. 1-4 when it is desired to close the shut-off valve 18 only in the event that the pressure in the line 20 rises above the normal pressure range. The construction shown in FIG. 6 is the same as the construction shown in FIG. 5 except that a high pressure spring seat 165 is substituted for the low pressure spring seat 158. Since the high pressure spring 156 is strong enough to withstand the normal pressure range in the line 20, the spring normally holds the spring seat 165 against the radial surface 86 as shown in FIG. 6. When the pressure in the line rises above the normal range, however, it overcomes the spring 156 to lift the spring seat 165 away from the radial surface 86 with consequent shift of the cam body 58 to the elevated position shown in FIG. 4 to open the relief valve 14 and thereby cause the shut-off valve 18 to close.

Figure 7:
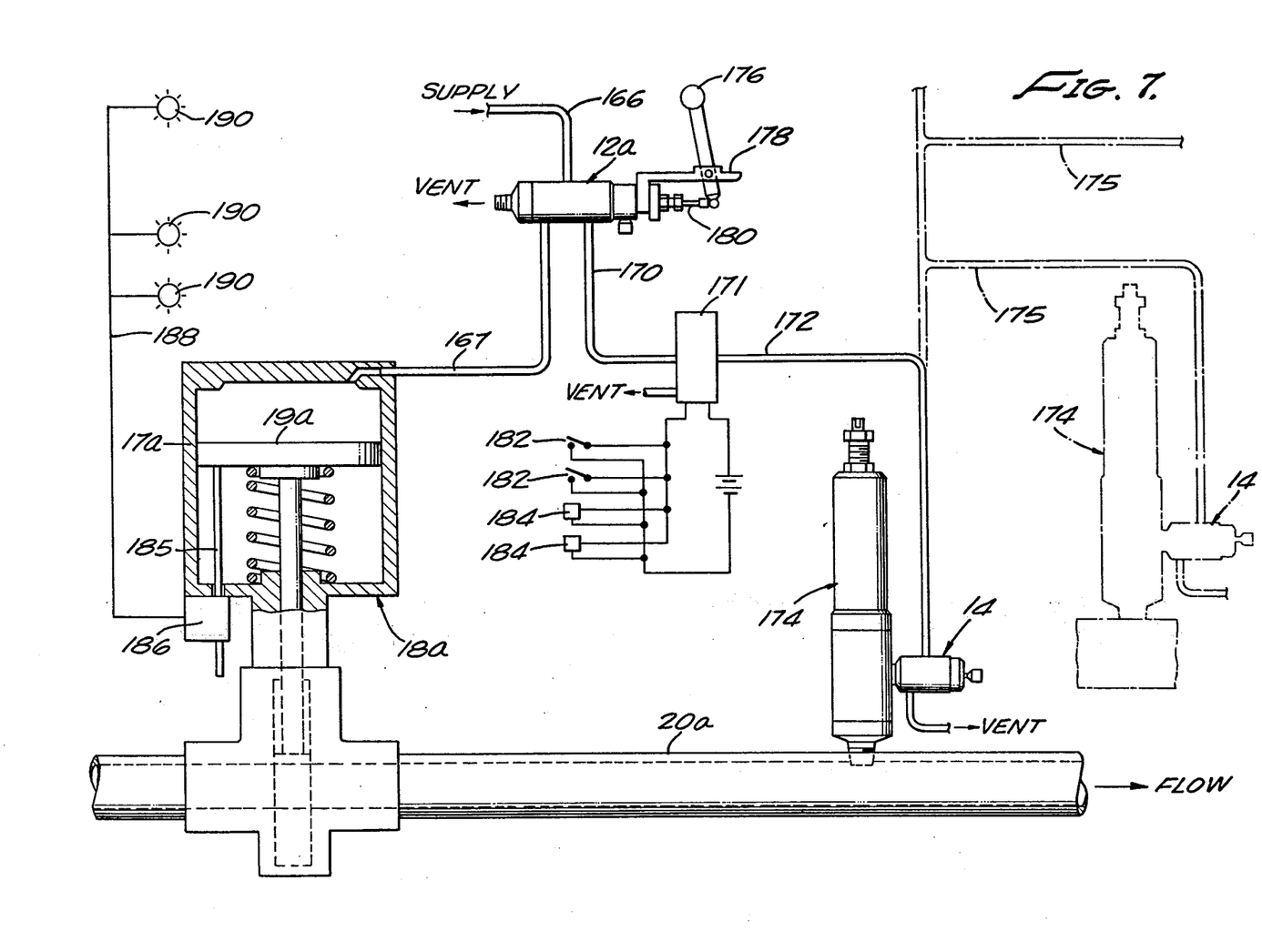

In a control system shown in FIG. 7 wherein a shut-off valve, generally designated 18a, controls flow through a fluid line 20a, the control fluid for normally holding the shut-off valve open is supplied to an actuator pilot 12a by a supply line 166 which is connected to the usual inlet port 114 (FIG. 1) of the actuator pilot. The outlet port 16 (FIG. 1) of the actuator pilot 12a supplies control fluid through a line 167 to the control cylinder 17a of the shut-off valve 18a.

The pilot port 21 (FIG. 1) of the actuator pilot 12a is connected by a line 170 to a 3-way solenoid valve 171 which, in turn, is connected by a line 172 to various monitor pilots 174. When the solenoid valve 171 is energized it vents the line 170 to the atmosphere thereby causing the actuator pilot 12a to vent. The venting of the actuator pilot 12a cuts off the flow of control fluid through the actuator pilot 12a and simultaneously releases control fluid from the control cylinder 17a to cause the shut-off valve 18a to close independently of operation of the monitor pilots 174.

In FIG. 7 one monitor pilot 174 is shown connected to the fluid line 20a relatively close to the shut-off valve 18a and, as indicated in phantom, additional monitor pilots 174 at more remote points are connected by lines 175 to the line 172. Thus, if any one of the monitor pilots 174 is tripped by an undue change in pressure in the line 20a or related system, the relief valve 14 of the monitor pilot opens to vent the actuator pilot 12a and thereby cause the actuator pilot to close the shut-off valve 18a.

The location of the solenoid valve 171 between the actuator pilot 12a and the monitor pilot 174 is important. It minimizes the amount of control fluid that is lost by opening of the relief valve because it vents the actuator pilot 12a and thus causes the actuator pilot to completely cut off the source of control fluid. If the solenoid valve were located between the actuator pilot 12a and the control cylinder 17a of the shut-off valve 18a, it would still cause the shut-off valve to close but it would also vent the supply source and would do so as long as the solenoid valve is kept energized in an emergency. If the supply source were bottled gas the supply source might be completely exhausted to make the control system inoperative.

The control pressure may be under such high pressure that more than ordinary force is required to depress the plunger 140 (FIG. 1) of the actuator pilot 12a. FIG. 7 shows how a lever 176 pivotally mounted on a bracket 178 may cooperate with a push rod 180 which abuts the plunger 140 (FIG. 1) of the actuator pilot 12a to facilitate manual depression of the plunger.

As indicated by the wiring diagram in FIG. 7, the solenoid valve 171 may be controlled independently by any number of switches 182, including panic buttons, at selected remote stations and the solenoid valve may also be controlled by switches incorporated in condition-sensing devices 184 at various remote points. For example, a sensing device 184 may respond to an unusually high temperature to cause the shut-off valve 18a to close in the event that a fire occurs at some remote point in the fluid system.

FIG. 7 also shows how a rod 185 extending downward from the piston 19a in the control cylinder 17a operates a switch 186 to indicate whether or not the shut-off valve 18a is open or closed. The switch 186 is connected by a multiple conductor cable 188 to a plurality of indicator lamps 190 at remote stations including remote stations where remote switches 182 and remote sensors 184 are located.

The line 21a in FIG. 1 may be omitted and instead the actuator pilot 12 may be directly mounted on the relief valve 14, as shown in FIG. 8, with the pilot port 21 of the actuator pilot connected to the chamber 24 of the relief valve by a short nipple 200. The result is a single structural unit which may be taken into the field and quickly mounted on a pipeline. It is necessary only to replace a conventional pipeline coupling with a coupling having a threaded port to receive the lower threaded end of the monitor pilot 10.

Another feature of the invention is that the pilot port 21 of the actuator pilot 12 is directly vented to the atmosphere through the relatively large vent port 30 of the relief valve 14 and the exhaust port 16 that releases fluid from the control cylinder 17 of the shut-off valve is vented directly to the atmosphere through exhaust port 26 of the actuator pilot. In conventional control systems, the actuator pilot is vented solely through the monitor pilot body with consequent corrosion and contamination of the mechanism of the monitor pilot.

A feature of primary importance is that the actuator pilot is structurally capable of withstanding extremely high control fluid pressures. Conventional actuator pilots are normally subject to pneumatic pressure on the order of 250 psi and would be destroyed by hydraulic pressure substantially higher than 2000 psi. The actuator pilot of the present disclosure can operate with a control pressure of 3000 psi or higher. Applying fluid pressure of 3000 psi to the outer face of the piston head 130 of the valve spool 122 in the actuator pilot 12 creates a thrust of approximately 1800 lbs. which may be destructive. The present invention solves this problem by causing the fluid pressure on the valve spool to develop a counterthrust on the spool to result in a net thrust that is well under 1800 lbs. In FIG. 3 the fluid thrust on the outer face of the piston head 130 is opposed by the counterfluid thrust on the smaller area of the inner annular face of the piston head and to a minor extent by the force of the spring 134. For a given pressure of the control fluid, the counterthrust on the inner annular face of the piston head 130 is approximately 42% of the thrust on the outer face of the piston head and the effect of the thrust of 1800 lbs. on the outer face of the piston head is reduced to approximately 1050 lbs.

The extend to which the valve spool counterbalances the pressure of the control fluid in this manner may be greatly increased by simply reducing the diameter of the valve seat 126 in FIG. 3. If the diameter of the valve seat is reduced by half, the counterbalance force is increased accordingly to enable the actuator pilot to withstand control pressure as high as 10,000 psi. In fact, the counterbalance force may be increased enough to make it practical to subject the actuator to hydraulic control pressures in the 10,000–20,000 psi range.

The importance of venting the actuator pilot 12 directly to the atmosphere through the exhaust port 26 of the actuator pilot and through the large vent port 30 of the relief valve 14, instead of solely through the body of the monitor pilot and the added importance of designing the actuator pilot to counterbalance the pressure of the control fluid may be understood when it is considered that these two features make it practical to use the fluid in a high pressure pipeline for the control fluid that is supplied to the actuator pilot 12 and to the control cylinder 17 of the main shut-off valve 18. Using the line fluid makes it unnecessary to provide a separate source of control fluid and this fact is of special importance at a remote location.

Unfortunately, the fluid in a high pressure oil well line is contaminated by entrained debris including rock particles and metal particles and venting such fluid through a monitor pilot would clog and otherwise damage the monitor pilot mechanism in a very short time. Diverting such contaminated control fluid through the exhaust port 26 of the actuator pilot and through the ample vent port 30 of the relief valve 14 solves this problem. In addition, providing two vent paths instead of one makes the actuator pilot 12 capable of venting control fluid at a much faster rate than otherwise possible.

The invention also affords new economies in the construction of a control system of the character described. If high hydraulic pressure is substituted for relatively low pneumatic pressure, the size of the control cylinder 17 and the piston 19 of the shut-off valve 18 may be greatly reduced to produce the same control thrust on the valve gate. It is also to be noted that using a construction for the actuator pilot that inherently counterbalances a substantial portion of the control fluid pressure makes it possible to use the relatively compact actuator shown in FIGS. 1-4 for a wide range of control fluid pressures.

The description herein in specific detail of selected embodiments of the invention will suggest various changes, substitutions and other departures from the disclosure within the spirit and scope of the appended claims.

We claim:

1. An actuator pilot, for control by a monitor pilot, to control the transmission of control pressure from a pressurized fluid source to a shut-off valve in a fluid line having a control connection with said monitor pilot, said actuator pilot comprising, in combination:

a body having four ports comprising an inlet port for communication with said pressurizied fluid source, an outlet port for communication with said shut-off valve, a pilot port for venting by the monitor pilot and an exhaust port, a valve spool in said body movable between a normal first position and a second position, said valve spool at its normal first position placing the inlet port in communication with the outlet port to keep the shut-off valve open, said valve spool at its second position cutting off the inlet port from the outlet port and placing the outlet port in communication with the exhaust port, said valve spool having a relatively small area facing in one direction in constant communication with the inlet port to cause bias pressure from the inlet port to bias the valve spool towards its second position, said valve spool having a relatively large area facing in the opposite direction to receive fluid pressure to urge the valve spool towards its first position, said valve spool at its first position placing said relatively large area in communication with the inlet port to receive fluid pressure from the inlet port to dominate the fluid pressure on the relatively small area to keep the valve spool at its first position as long as the pilot port is not vented, venting of the pilot valve reducing the pressure on the relatively large area to permit the pressure on the relatively small area to shift the valve spool to its second position;

manually operable means to shift the spool from its second position to its normal first position in opposition to said bias pressure, whereby with the shut-off valve closed and pressure in the fluid line below a normal range, the spool may be shifted manually from its second position to its normal first position temporarily to cause the shut-off valve to open to build up pressure in the fluid line to a normal range and thus cause the monitor pilot to cut off flow from the pilot port to cause the fluid pressure on the relatively large area to rise to a magnitude to keep the spool at its normal first position as long as the pressure in the fluid line remains in said normal range;

a plunger separate from the valve spool supported for independent movement in said body in alignment with the valve spool and with one end being accessible from the exterior of the actuator pilot, said plunger being normally held by fluid pressure at a position protruding beyond one end of said body, said plunger being manually movable to an inner position to engage and shift the valve spool from its second position to its normal first position; and detent means to engage the plunger at its inner position, said detent means being of a strength to yield to the fluid pressure on the plunger when the fluid pressure on the spool rises sufficiently to keep the spool in its normal first position.

2. An actuator pilot as set forth in claim 1 which includes resilient means interposed between the plunger and the spool to transmit force from the plunger to the spool.

* * * * *